Feb. 26, 1929.
J. J. FLANIGAN
1,703,140
DUPLICATING MACHINE
Filed April 6, 1925    9 Sheets-Sheet 4
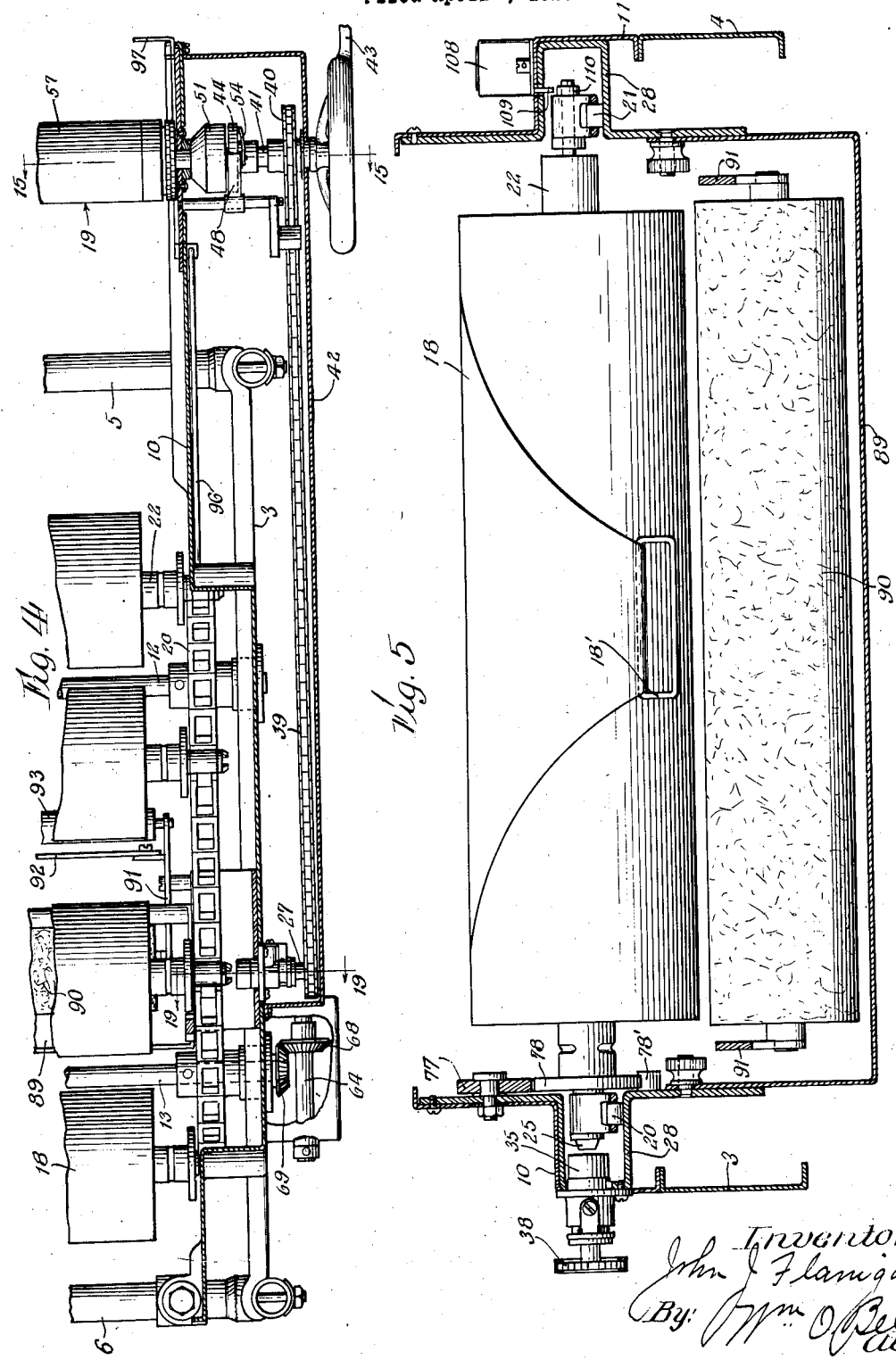

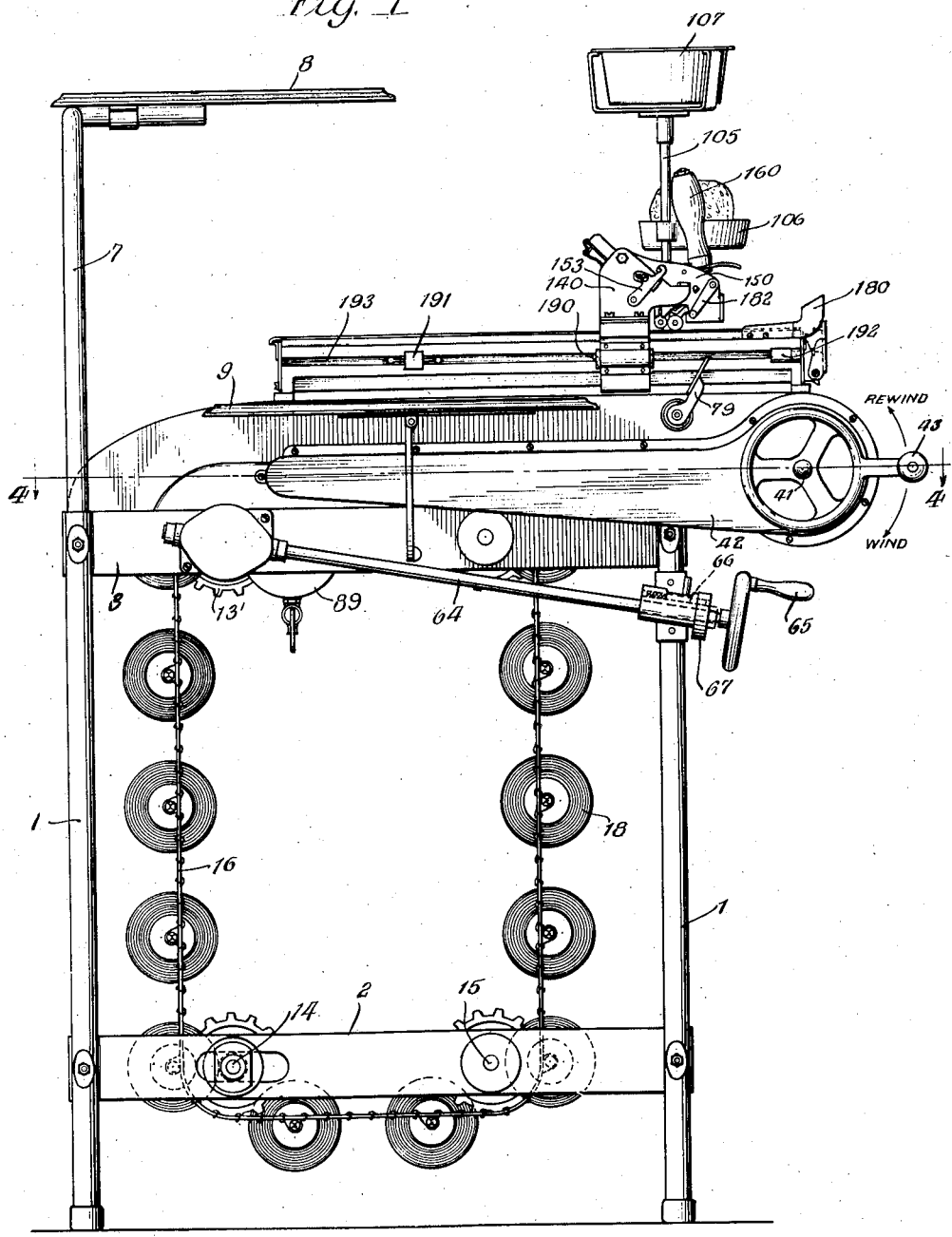

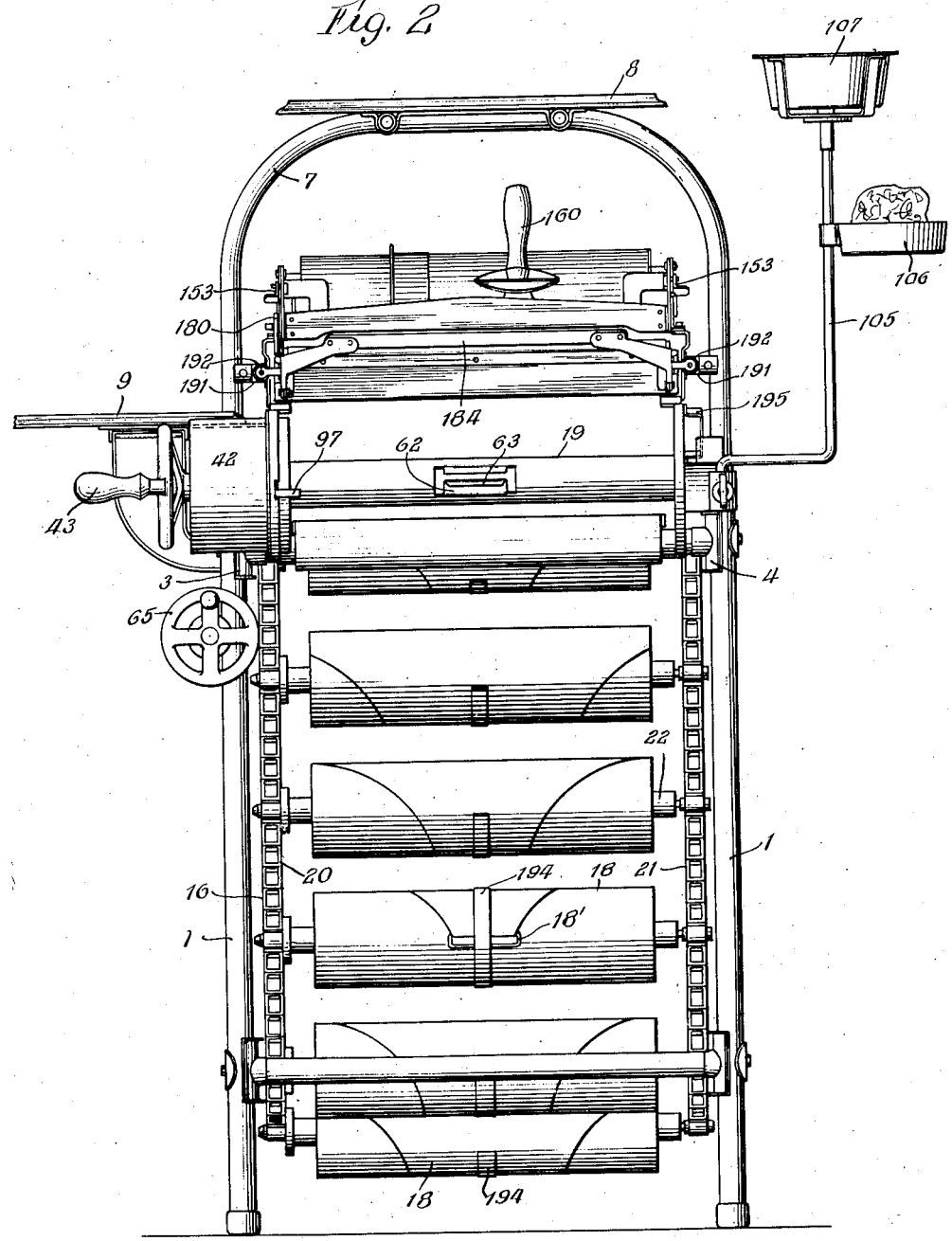

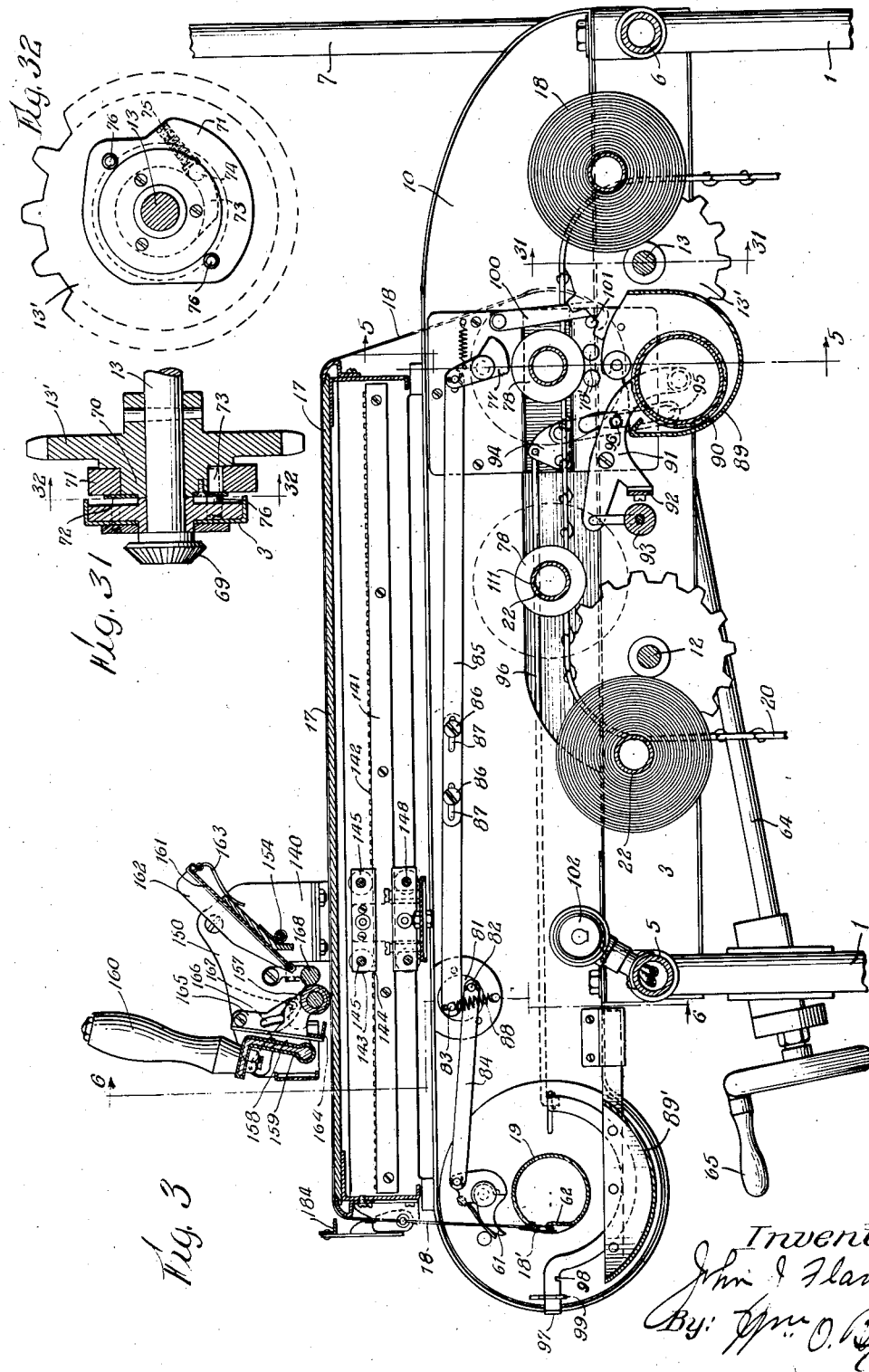

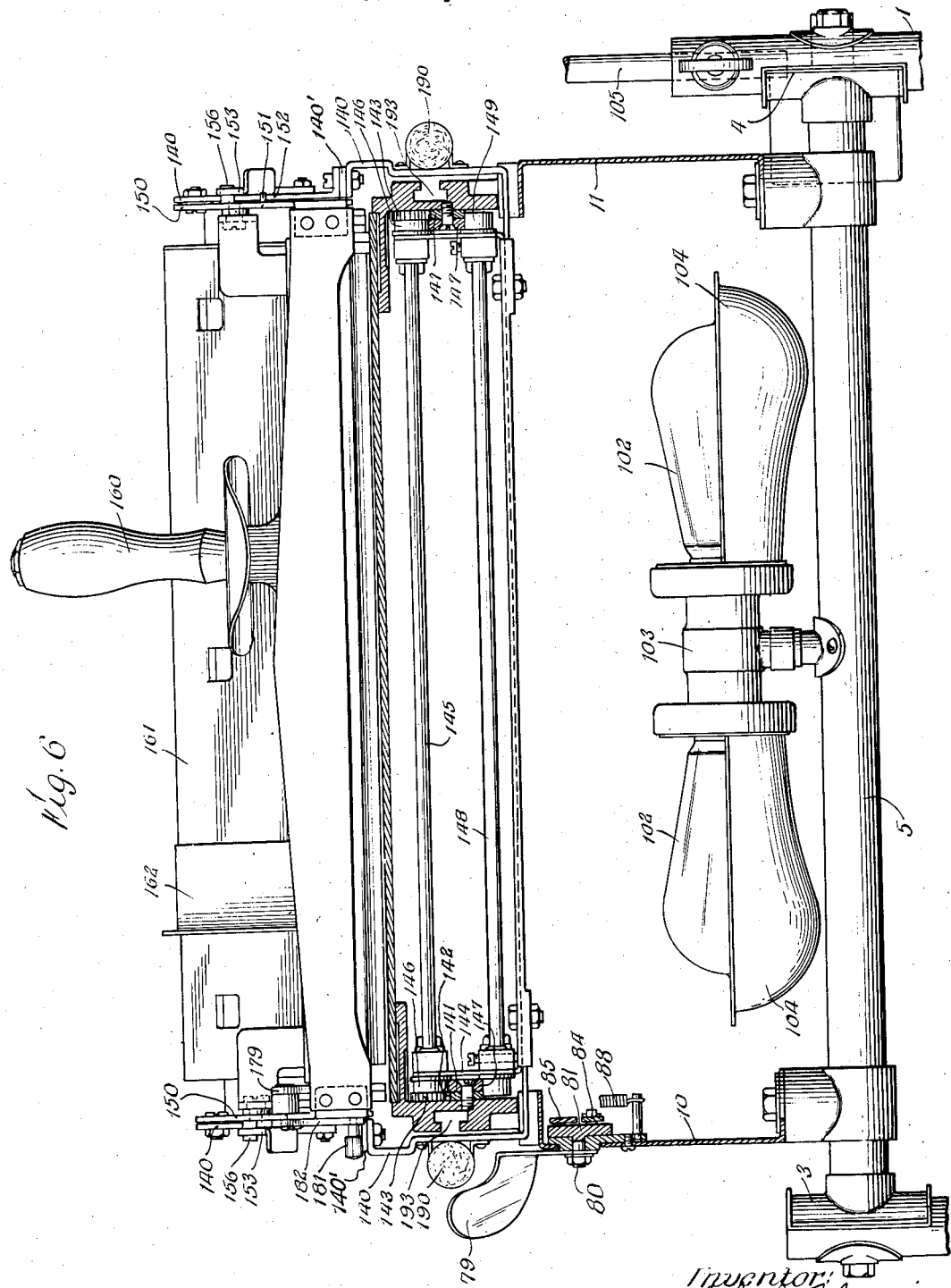

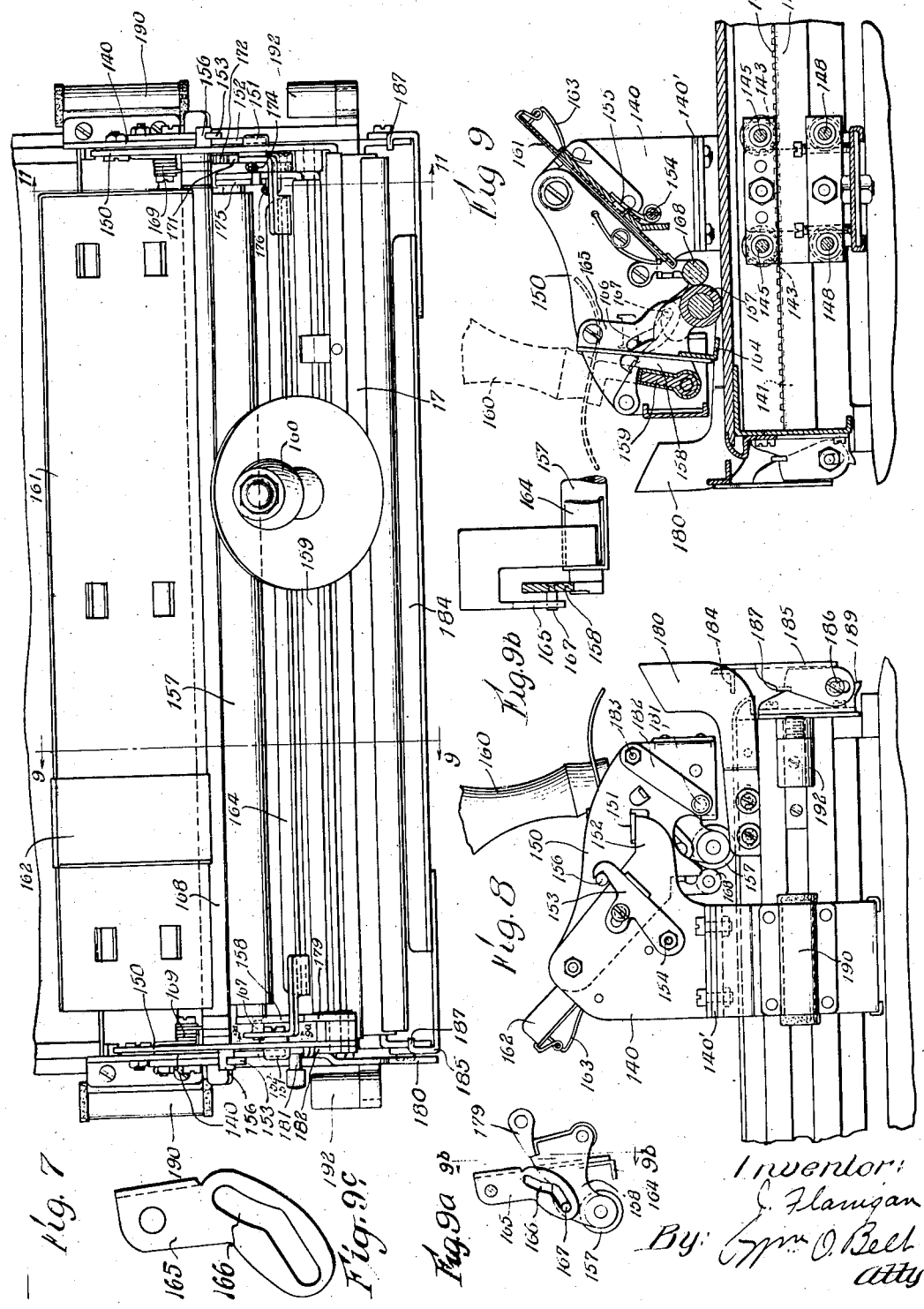

Feb. 26, 1929.  J. J. FLANIGAN  1,703,140
DUPLICATING MACHINE
Filed April 6, 1925    9 Sheets-Sheet 7
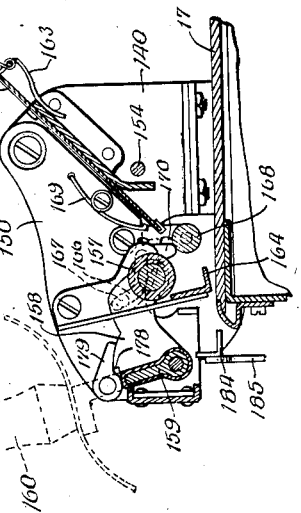
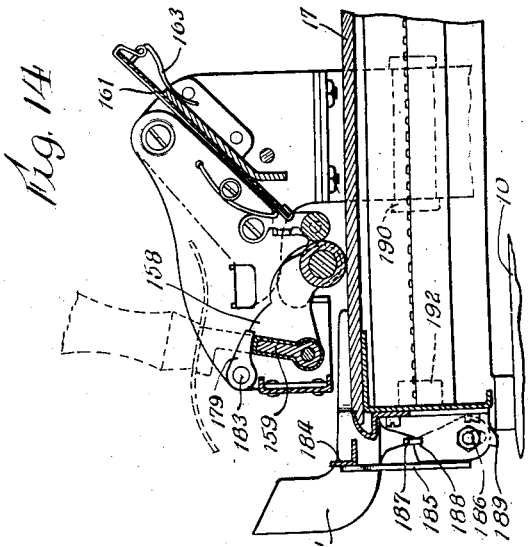
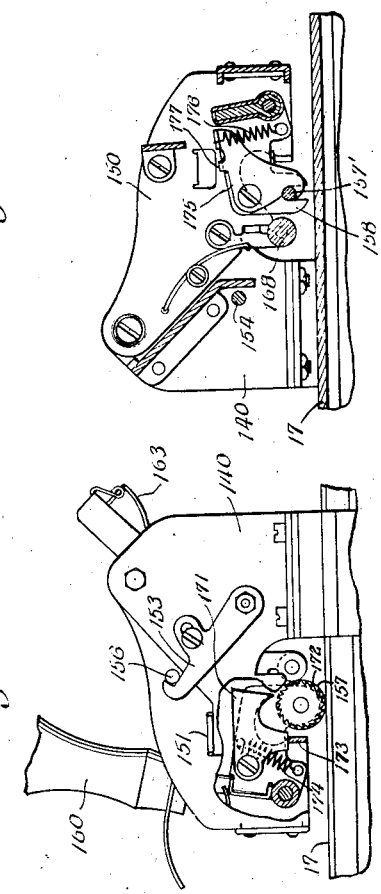
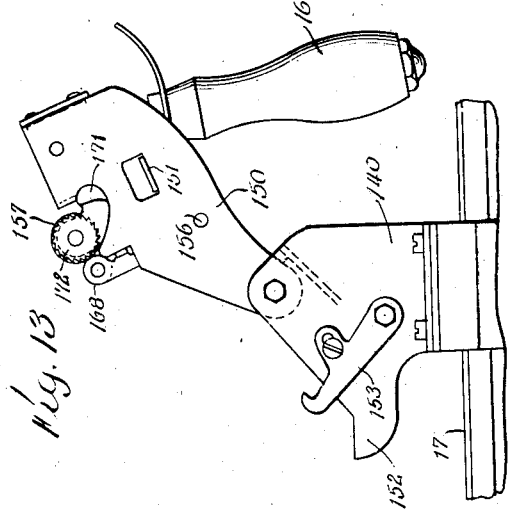
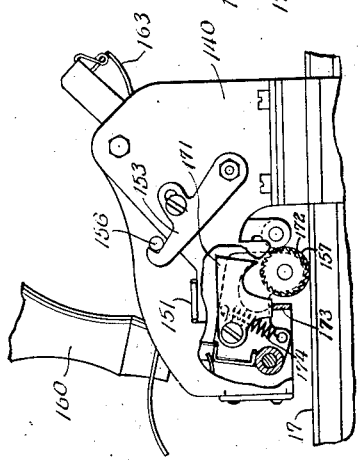

Feb. 26, 1929.
J. J. FLANIGAN
1,703,140
DUPLICATING MACHINE
Filed April 6, 1925
9 Sheets-Sheet 8
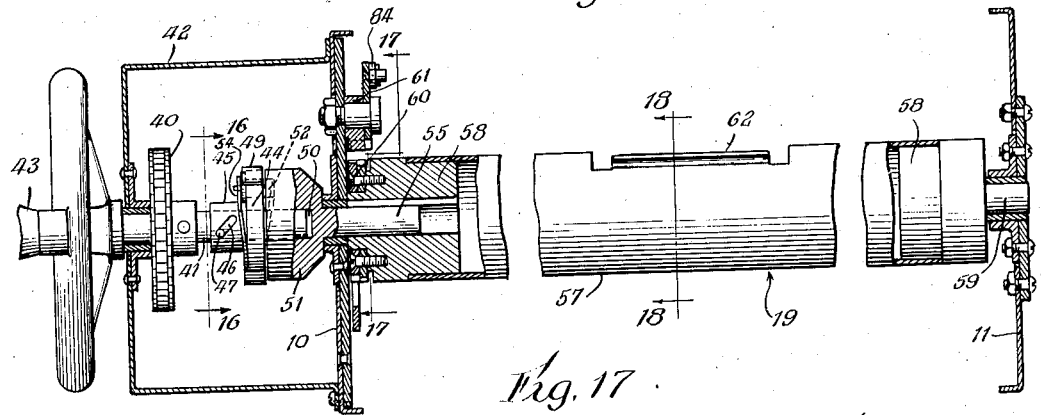
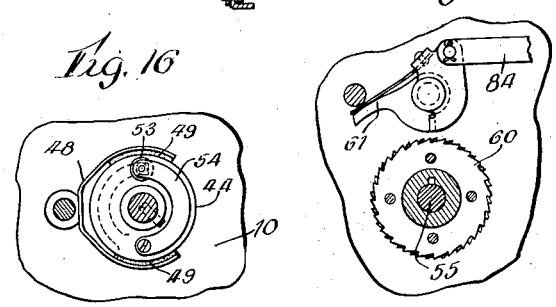
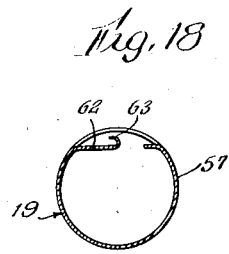
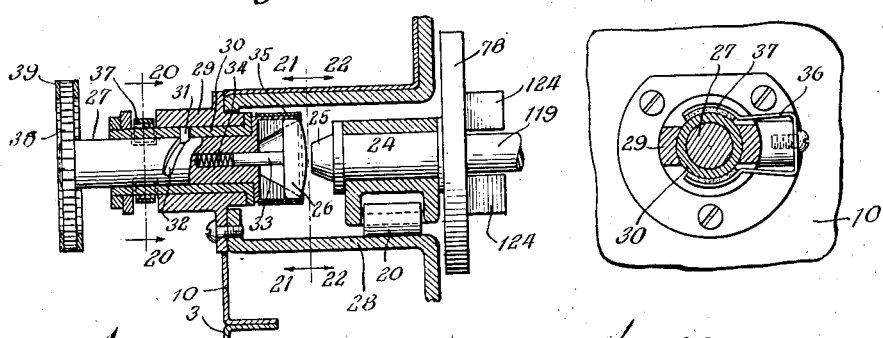
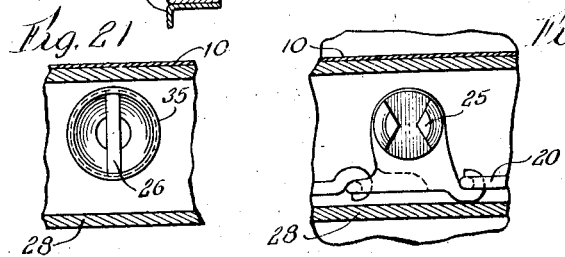

Feb. 26, 1929.
J. J. FLANIGAN
1,703,140
DUPLICATING MACHINE
Filed April 6, 1925    9 Sheets-Sheet 9
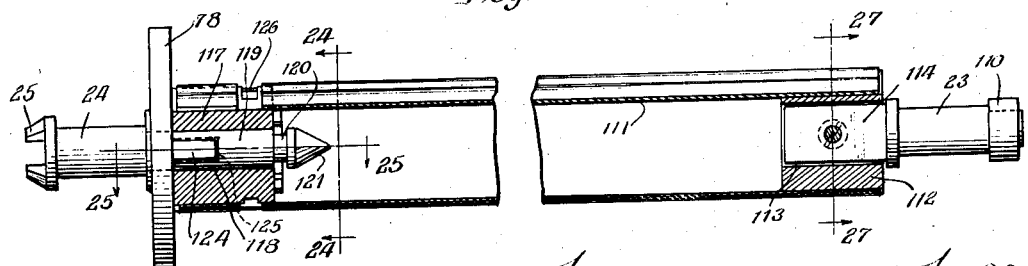
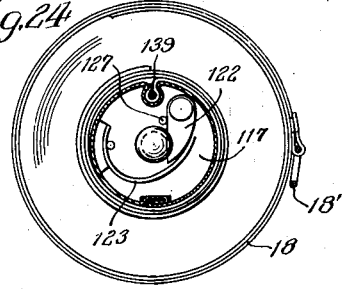 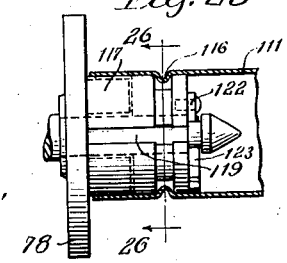 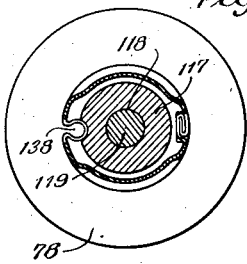
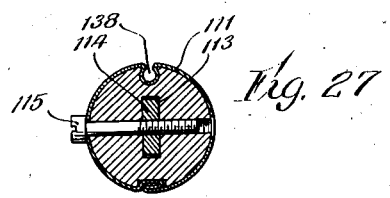
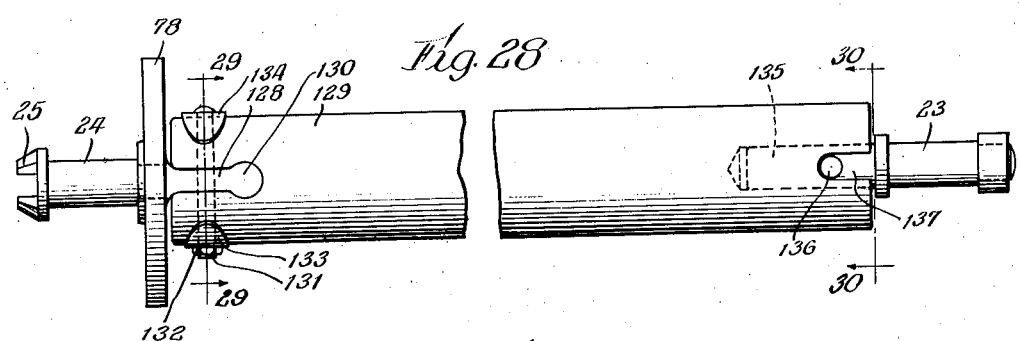
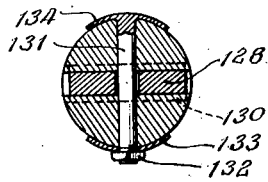 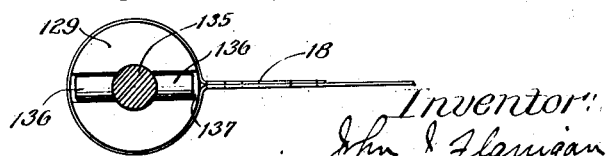

Patented Feb. 26, 1929.

1,703,140

UNITED STATES PATENT OFFICE.

JOHN J. FLANIGAN, OF OAK PARK, ILLINOIS.

DUPLICATING MACHINE.

Application filed April 6, 1925. Serial No. 20,890.

This invention relates to a novel and improved hectograph duplicating machine of the type in which a gelatin band is stretched over a bed plate. A letter or the like which it is desired to copy is then brought in contact with the gelatin band, leaving an impression thereon. This impression is transferred to sheets of blank paper which are brought in contact with the portion of the gelatin band which received the impression. Means are usually provided for mounting a roll of the gelatin band upon the framework of the machine and pulling it across the top of the bed plate. During this operation the gelatin band has to be moistened, and for that purpose it has been customary for the operator of the machine to use a sponge. The result has been that the water, which is usually kept in a small receptacle, soon becomes dirty and moreover the operator sometimes gets too much and sometimes too little water upon the band. After a roll of gelatin band has been employed, it has to be set aside for a certain length of time before it can be employed again, and for this purpose a separate rack is usually provided. However, there is no certainty that the roll will be left for the the proper length of time before being used again, with the result that many rolls are used too often, while others are not used as often as they might be, and the work done by the machine suffers accordingly in lack of uniformity and in poor results. Moreover, the rolls intended to be employed with a particular machine are often replaced by unauthorized persons with rolls of gelatin band of inferior quality.

It is therefore a primary object of my invention to provide a duplicating machine in which all of the above disadvantages will be avoided.

More specifically, one of the principal objects of my invention is to provide a duplicating machine in which the rolls of gelatin band will be permanently carried by the machine with which they are intended to be used.

A further object of my invention is to attach said rolls in such a manner that it is impossible to remove them without destroying a part of the mechanism, so that unauthorized persons will be prevented from removing them.

It is a still further object of the invention to mount the rolls of gelatin band upon a conveyor in such a manner that the separate rolls may be brought consecutively into position for use, the conveyor being so arranged that it is capable of travel in only one direction, thereby insuring that the rolls shall be used in their proper sequence.

A still further object of my invention is to provide a novel and improved means for rewinding a gelatin band upon its roll after it has been used, and without removal from the machine.

Another object of my invention is to provide novel and improved means for wetting the gelatin band as it is unwound and rewound and without the necessity of employing manual means for this purpose.

Still another object is to provide means for securely holding the gelatin band in position when operating the duplicating mechanism. This I achieve by locking the roll from which the band is being unwound and also the reel upon which it is being wound. When this locking means is applied I also provide novel and improved means for bracing the frame, thereby making possible the building of the frame of lighter material than would otherwise be required.

It is still another object of my invention to provide a novel and improved carriage for the platen which shall remove the weight of the platen entirely from the gelatin band, thus avoiding damaging the band and wrinkling the paper which is placed on the band.

It is a further object of my invention to provide novel and improved means for preventing rotation of the platen prior to movement of the carriage and platen across the gelatin band. Such prior movement would result in inaccurate work because of lack of registration due to the fact that the revolving roller would move the sheet of paper with which it comes in contact. This feature is avoided by my novel and improved means aforesaid.

A still further object is to provide novel and improved means for operating the automatic margin bar which may be used instead of the standard margin bar for certain classes of work and which engages the edge of the paper as it is inserted in the duplicating machine in order to properly gauge it and which margin bar is then automatically moved out from under the paper by movement of the platen into operative position.

Another object of my invention is to provide novel and improved means for holding the paper in engagement with the platen.

Still another object is to provide a novel and improved means for mounting a standard margin bar which may be used for certain classes of work, and in such a manner that it may be readily removed from its operative position when the automatic margin bar is employed, and securely held in proper operative position when in use.

Yet another object is to provide a novel and improved paper guide with improved means for securing it in adjusted position upon the guide chute of the machine.

A further object is to provide novel and improved means for releasably holding the platen in position in the frame whereby it may be easily removed, when it is desired to do so for cleaning and renewal or for other purposes.

A still further object is to provide a platen frame so pivoted upon its carriage that it may be readily lifted to a position wherein the platen may be cleaned or replaced or wherein other repairs or replacements may be easily and conveniently made. By providing the frame thus pivoted to the carriage it is possible to gain ready access to the platen and other parts without disturbing the relation of the carriage to the bed plate and therefore affecting the accuracy of the mechanism.

Yet a further object of my invention is to provide a spindle of novel and improved form, together with means for fastening the same to a conveyor in such a manner that it cannot be removed therefrom without destroying the spindle, together with means for permanently fastening a gelatin band thereto, so that the band cannot be removed from the spindle without breaking it or the spindle, or some part of the mechanism.

Another object is to provide a novel and improved spindle of a different form than the aforementioned spindle and to which a gelatin band is permanently secured.

Still another object is to provide a gelatin band upon a spindle and having its outer end provided with a clip adapted to engage a reel permanently mounted upon the machine, so that the band may be unwound from its spindle and wound upon said reel.

Yet another object is to provide a duplicating machine which is arranged for easy and efficient operation with a minimum of labor, which shall do accurate work at all times, and which may be readily manipulated by inexperienced operators.

In the accompanying drawings in which I have shown a selected embodiment of my invention, Fig. 1 is a side elevation of the entire machine.

Fig. 2 is an end elevation thereof, this figure being taken looking from the right end of Fig. 1.

Fig. 3 is a vertical longitudinal section through the machine.

Fig. 4 is a fragmentary section taken on the line 4—4 of Fig. 1.

Fig. 5 is a section on the line 5—5 of Fig. 3.

Fig. 6 is a section on the line 6—6 of Fig. 3.

Fig. 7 is a plan view of the platen carriage and frame.

Fig. 8 is an end elevation of the platen carriage and frame, this view being taken from the left of Fig. 7.

Fig. 9 is a section on the line 9—9 of Fig. 7.

Fig. $9^a$ is a section on the line $9^a$—$9^a$ of Fig. 7.

Fig. $9^b$ is a section on the line $9^b$—$9^b$ of Fig. $9^a$.

Fig. $9^c$ is an enlarged detail view showing slot 166.

Fig. 10 is an end elevation taken from the right of Fig. 7, parts being broken away.

Fig. 11 is a section on the line 11—11 of Fig. 7.

Fig. 12 is a section corresponding to Fig. 9 and showing some of the parts therein, but illustrating a different position which they take during the operation thereof.

Fig. 13 is a view illustrating the pivoted relation of the platen frame to the carriage.

Fig. 14 is a view similar to Fig. 9, but showing a form of carriage omitting the automatic margin bar.

Fig. 15 is a section on the line 15—15 of Fig. 4.

Fig. 16 is a section on the line 16—16 of Fig. 15.

Fig. 17 is a section on the line 17—17 of Fig. 15.

Fig. 18 is a section on the line 18—18 of Fig. 15.

Fig. 19 is a section on the line 19—19 of Fig. 4.

Fig. 20 is a section on the line 20—20 of Fig. 19.

Figs. 21 and 22 are sections on the lines 21—21 and 22—22 of Fig. 19, these lines being coincident, but the views being taken looking in opposite directions.

Fig. 23 is a longitudinal sectional view of one form of my novel and improved spindle for use with the gelatin band.

Fig. 24 is a section on the line 24—24 of Fig. 23.

Fig. 25 is a section on the line 25—25 of Fig. 23.

Fig. 26 is a section on the line 26—26 of Fig. 25.

Fig. 27 is a section on the line 27—27 of Fig. 23.

Fig. 28 is a side view of another form of my novel and improved spindle for use with a gelatin band.

Fig. 29 is a section on the line 29—29 of Fig. 28.

Fig. 30 is a section on the line 30—30 of Fig. 28.

Fig. 31 is a section on the line 31—31 of Fig. 3, and

Fig. 32 is a section on the line 32—32 of Fig. 31.

Referring now to the drawings, my novel and improved duplicating mechanism is mounted upon a suitable frame comprising vertical legs 1 and horizontal frame members 2 at the bottom and horizontal frame members 3 and 4 at the top. Connecting the legs 1 are other horizontal frame members 5 and 6. As shown, the members 1, 5 and 6 may conveniently be made of tubular construction, thus forming a rigid frame. In order to lighten the structure as much as possible, I prefer to make the frame members 2, 3 and 4 of sheet metal, and by proper construction I find that I can employ this type of material and still achieve a rigid mechanism. Extending upwardly from the rear legs 1 is a support 7 in the form of an inverted U and mounted thereon is a table 8 for a purpose which will presently appear. Supported on the frame on the left side thereof as viewed in Fig. 2 is another table 9 also for a purpose which will presently appear. Supported upon the frame members 5 and 6 are channels 10 and 11 which carry the operating mechanism.

Journaled on the frame are a plurality of shafts 12, 13, 14 and 15, each provided with sprockets over which is trained a chain conveyor 16. While I have shown and described a chain conveyor, any other suitable type may be employed. This conveyor carries thereon a plurality of spindles at spaced intervals, and I contemplate making the conveyor of the proper length to provide a sufficient number of rolls of the gelatin band so that when all of them have been used in succession, the first one which was used will again be in condition for re-use. The number of spindles will therefore vary with the kind and amount of work which it is desired that the machine shall perform, but I space the spindles apart on the conveyor a fixed distance no matter what number of spindles are used. The reason for this will presently appear. If more or less spindles are required, I provide a shorter conveyor or a longer one with another idler sprocket to take care of the additional length of conveyor. As shown in Fig. 1 one of the sprocket shafts as at 14 is slidably journaled in the frame so as to facilitate adjustment of the conveyor and removal thereof from the sprocket.

Supported upon the frame is a bed plate 17 over which is fed the gelatin band 18 carried on one of the spindles on the conveyor, and I provide means for bringing one of the spindles at a time into position wherein the band which is wound thereon may be stretched over the bed plate, secured to the reel 19 at the other end thereof and wound on said reel. After the band on the particular spindle is completely unwound, I provide means for rewinding the same. Then the conveyor is operated to bring another spindle into position, and the operation just described is repeated. The conveyor in the embodiment which I have shown comprises two chains 20 and 21, on which are mounted the spindles 22. Each spindle 22 is provided at one end with a suitable journal 23 for engagement with the chain 21, and at the other end with a similar journal 24 for engagement with the chain 20. At the latter end each spindle is also provided with a clutch member 25 adapted to co-act with a mating clutch member 26 upon the shaft 27. This construction is shown particularly in Figs. 19, 21 and 22, where it will be seen that the chain 20 runs on a shelf 28 on the frame, which shelf supports it in a position wherein the clutch member 25 is in proper vertical relation to the clutch member 26. Revolubly mounted in a suitable bearing 29 is a sleeve 30 carrying a pin 31 engaging in a spiral groove 32 in the shaft 27. The clutch member 26 is carried by a stem 33 sliding in a recess in the shaft 27 and resiliently urged outwardly by means of the spring 34. The outward movement of the clutch member 26 is limited by suitable means such as a member 35 secured to the enlarged end of the shaft 27 and engaging the clutch member adjacent its edges. The sleeve 30 is engaged with a retarding brake which may consist of a single spring member 36 having two arms provided with suitable brake pads 37 contacting with the sleeve, for a purpose which will presently appear. The extent of the spiral groove 32 is sufficient so that relative movement between the shaft 27 and sleeve 30 may cause engagement and dis-engagement of the members 25 and 26, the spring 34 permitting the member 26 to give so as to avoid injury to either of the members 25 or 26 if they do not mesh in the position in which they are first brought together. Mounted upon the outer end of the shaft 27 is a sprocket wheel 38 carrying a sprocket chain 39 which is also trained over a sprocket wheel 40 upon the shaft 41 (Figs. 1, 4 and 15). The shaft 41 extends through a side of the casing 42 carried by the frame and is provided with suitable operating means exemplified by a crank having a handle 43. The other end of the shaft 41 carries a clutch member 44 having a hub 45 provided with a spiral groove 46 engaging a pin 47 upon the shaft 41. The outer periphery of the member 44 is yieldingly held against rotation by a suitable brake member 48 comprising arms having brake pads 49 contacting with the periphery of the member 44 for a purpose which will presently appear. The shaft 41 has its end journaled in a recess 50 in a mating clutch member 51 which is provided with an arcuate recess 52 of gradually increasing depth which receives a plunger 53 carried by the clutch member 44 and resiliently urged into operative position by a spring 54. The clutch member 51 is carried by a stub shaft 55 on which is mounted the reel 19. This reel may conveniently be made of a tubular member 57 of sheet metal supported by cylindrical wooden members 58 at either end and receiving the shafts 55 and 59 to support the reel in the frame. At one end of the reel it is provided with a ratchet 60 adapted to be engaged by a pawl 61 (see Figs. 3, 15 and 17). The purpose of this construction will presently appear.

The tubular member 57 is provided with means for engaging a clip upon the end of the gelatin band, and this means comprises a lip 62 which may be struck inwardly from the material of the member and bent to form a hook 63 upon which the clip is secured.

In the operation of the mechanism just described a roll of gelatin band is brought into position so that its spindle may be clutched to the shaft 27, as shown in Fig. 19, the band is then stretched over the bed plate and attached to the reel 19 as shown in Fig. 3. The handle 43 is then turned in a clockwise direction (Fig. 1) and the clutch members 44 and 51 will become engaged, if not already in engagement. It will be seen that as the handle 43 is turned in the direction indicated the pin 47 will move to the position shown in Fig. 15, the clutch member 44 being retarded by the brake pads 49. When the pin has reached this position, continued rotation of the shaft 41 will cause the pin to carry with it the clutch member 44, which has been forced by the pin 47 into operative position with relation to the clutch member 51. Clockwise rotation of the handle 43 and the shaft 41 will result in similar rotation of the shaft 27, and it will be seen that this rotation will result in the shaft being drawn out to the position shown in Fig. 19, wherein the clutch elements 25 and 26 are out of engagement. The brake pads 37 during this outward movement of the shaft 27 will hold the sleeve 30 against rotation in order to permit the outward movement of the shaft, and then of course the sleeve will revolve with the shaft. It will thus be evident that the winding operation is performed entirely by the reel which will pull the gelatin band over the bed plate. When the band has been entirely unwound from its spindle all that is necessary to rewind it is to reverse the direction of rotation of the shaft 41 by means of the handle 43. This reversal will cause the clutch member 26 to move into engagement with the clutch member 25 and the clutch member 44 to move out of engagement with the clutch member 51, these movements of the clutch members being governed by the spiral grooves and pins, as will be obvious, the brake pads 37 and 49 again functioning to permit this movement. Then it will be evident that continued rotation of the handle 43 will cause a rewinding of the band. After the band has been completely rewound upon the spindle, the conveyor is then operated to bring another roll into position for use. This is done by the means now to be described. Mounted upon the frame in suitable bearings is a shaft 64 provided at one end with a handle 65, and it will be noted that this handle is conveniently adjacent to the handle 43 so that both may be manipulated by the operator with ease. The shaft is latched against rotation by a sliding bolt 66 engaging a recess in the hub 67, the recess being so positioned that when a roll is in place for use the bolt will engage in the recess, thereby insuring that the spindle of the roll which is to be used is in correct position for engagement of the clutch members 25 and 26. The end of the shaft 64, remote from the handle 65, is provided with a bevel gear 68, (Fig. 4) meshing with a bevel gear 69 upon the sprocket shaft 13. By this means it is evident that the conveyor is operated to bring each roll consecutively into position for use and to accurately place the spindle of each roll.

In order to insure that the conveyor is always operated in one direction so that the rolls will be used in consecutive order, I provide a means for preventing reverse operation of the conveyor. This means is exemplified by the device shown in Figs. 31 and 32, and referring to those figures it will be seen that I utilize the sprocket wheel 13' on the shaft 13 as one of the elements of a brake. Mounted upon the hub 70 of the sprocket wheel 13' is an annular member 71 held in place on the hub as by a plate 72. The member 71 is recessed as at 73, said recess being of varying depth and receiving a roller 74, resiliently urged into the recess as by a spring 75 received in a recess in the member 71, the member 71 being enlarged as shown for the purpose of accommodating the recess 73 and the spring 75. The member 71 is secured to the frame member 3 by any suitable means 76. It will therefore be evident that rotation of the sprocket wheel 13' in a counter clockwise direction (Fig. 32) may be accomplished, but that rotation in a clockwise direction will be prevented by the fact that the roller 74 will jam in the recess 73, thereby preventing operation of the conveyor in the reverse direction.

When the band is stretched over the bed plate it is desirable to have the mechanism so arranged that it cannot be inadvertently operated to move the band, and thereby disturb the impression which is being employed at the time. For this purpose I provide the pawl 61 referred to above to engage the ratchet 60 on the reel and also a friction brake 77 adapted to engage the disk 78, one of these disks being provided on each of the spindles on which the band is rolled. As best shown in Fig. 3, the pawl 61 is pivoted adjacent the reel and the brake 77 is pivoted adjacent the position wherein the spindles come to rest when the bands thereon are to be unwound. The pawl and the brake are operated in unison by the handle 79 pivotally mounted upon the frame as shown in Fig. 6 and having a stub shaft 80 extending therethrough. The stub shaft is preferably integral with a disk 81 suitably supported on the inner side of the frame and carrying pins 82 and 83 on which are pivoted links 84 and 85 which are in turn pivoted to the pawl 61 and brake 77 respectively. In order to adjust the brake 77 I prefer to make the link 85 in two parts slidably connected by screws 86 fast in one part and sliding in slots 87 in the other part. It is of course obvious that a similar adjusting means may be employed with the link 84 if found desirable. The disk 81 is held in either operative or inoperative position by the spring 88 secured to the pin 83 and also to the frame in such a manner that its axis will cross the center of rotation of the disk 81 and thereby resiliently hold it in position. When the reel 19 and a spindle are locked in position as just described, a certain strain is put upon the frame, and it would therefore normally be necessary to make the frame of rigid construction to withstand this strain. As before noted, however, I make the side members of the frame of light material and in order to brace them when the locking means just described is applied, I provide the dog 100 (Fig. 3) pivoted upon the upper part of the frame member 10 above the shelf 28 and engaging a pin 101 beneath the shelf, thus avoiding spreading of the frame on opposite sides of the shelf and providing a rigid structure. The lower end of the dog is made in the form of a hook which is shown in broken lines in Fig. 3 in engagement with the pin 101. When the brake 77 is applied to the disk 78 there is a tendency to spread the parts and the hook of the dog 100 engages the pin 101 and prevents spreading due to the use of light materials. When the brake is released the hook will also be released from the pin and will ride over the disk 78 when the roll travels to the right (Fig. 3). Beneath the disk 78 when in operative position are one or more pins 78' adapted to contact with the disk when the brake 77 is applied thereto, and cooperating with the brake to hold the disk against rotation.

It is necessary to wet the gelatin band before use, and this I perform by means now to be described. Secured on the frame is a water pan 89 in which is placed a wetting roll 90 made of suitable material and carried by arms 91 mounted on each of the side frame members and connected by a tie 92. A counter weight 93 tends to force the roll 90 into engagement with the roll of gelatin band on a spindle, which has been brought into operative position, as plainly shown in Fig. 3. When it is desirable to move the wetting roll out of engagement with the gelatin band as in re-winding the same, I accomplish this by means of a lever 94 pivoted upon the frame and having an elongated slot 95 in which is received a pin 96 on the arm 91. The lever 94 is operated from the same end of the machine whereon the handles 43 and 65 are placed by means of a link 96 provided with a handle 97 and which has a plurality of notches 98 therein to engage a detent 99 so as to hold the wetting roll in any one of several desired positions. It will thus be seen that all that is necessary is to lift and pull or push the handle 97 from one notch to another. A suitable drip pan 89' is arranged under the reel 19.

When it is desired for any reason to inspect the impression made upon the gelatin band, the bed plate 17 may be removed and a transparent plate substituted therefor. When this is done the plate may be illuminated by a plurality of lamps 102 secured in a bracket 103 upon the frame member 5 and provided with reflectors 104. The frame members 1 and 5 being tubular, the wiring for these lamps may be conveniently enclosed therein and suitable switches provided for control thereof.

When the gelatin band in its moistened condition is stretched over the bed plate, it is often found that it is too wet, and therefore it is necessary to remove some of the moisture. This may be conveniently done by providing a standard 105 carrying a tray 106 for the reception of a sponge or the like, and also provided with a receptacle 107 into which the water from the sponge may be squeezed. It will therefore be evident that the moisture may be removed from the surface of the gelatin band by means of the sponge, the sponge squeezed into the receptacle and placed in the tray. This is a big improvement over the old method of having the sponge in a water receptacle and mopping the water onto the gelatin band with the disadvantages outlined above.

Referring particularly to Fig. 5, there is shown therein a suitable counter at 108 having a finger 109 depending, adjacent the path of the hubs 110, on the spindles. It will be seen that the hubs will just miss the finger 109, but I provide one hub in each set of spindles carried by a conveyor of a size such that it will strip the finger 109 and actuate the counter. By this means it is possible to check up on users of the machine, to be sure that the entire contents of the conveyor have been used a sufficient number of times, instead of having one roll used more than another or instead of having the entire number of rolls used more often than they are designed to be used.

Referring now particularly to Figs. 23 to 27 inclusive, I have shown therein a type of spindle which is designed to be permanently attached to the conveyor so that it may not be removed by unauthorized persons. This spindle consists of a tubular sheet metal cylinder 111 secured at one end to a hub 112, provided with a rectangularly shaped recess 113 receiving a similarly shaped part 114 of the journal 23. The parts are fastened together as by a bolt 115. The other end of the tubular member 111 is secured as by crimping at 116 to a hub 117, said hub having a central bore 118 therein. This bore receives a stem 119 of the journal 24 and this stem is preferably provided with an arcuate groove 120 adjacent its end, the end being pointed as shown at 121. Pivoted on the hub 117 at its end is a pawl 122 urged towards the center of the hub by a spring 123. When the stem 119 is inserted in the bore 118, its pointed end will force the pawl to one side and it will then snap back into the groove 120. It will thus be seen that the spindle cannot be removed from the conveyor as the fastening means comprising the pawl 122 is completely enclosed within the body of the spindle. The disk 78 which forms a rigid part of the journal 24 is provided with means 124 engaging in a recess 125 in the hub to secure these parts together for rotation in unison. The journals 23 and 24 being permanently secured to chains forming the conveyor, it will be seen that the spindle cannot be removed without destroying some vital part of the mechanism. The tubular member 111 is provided with one or more openings 126 adjacent the end having the hub 112 so that a suitable tool may be inserted therein to cut around the tubular member and thus remove it, but it will be seen that it is necessary to destroy the spindle in order to effect this removal. The hub 117 is provided with a suitable stop 127 to limit movement of the pawl 122 beyond a point where it may be pushed aside by the point 121 of the stem.

In Figs. 28, 29 and 30 I have shown a preferred form of my spindle, in this embodiment the journal 24 having the disk 78 rigid therewith, as in the other embodiment, and provided with a rectangular projection 128 entering a correspondingly shaped recess in the body of a wooden spindle 129. It will be noted that the end of the projection 128 is enlarged as at 130, and therefore the spindle is put in place by side movement thereof and the enlarged end will hold it against longitudinal displacement and also against rotation about the bolt or the like 131, which passes through the spindle 129 and the projection 128 and is secured by a nut 132 upon the other end thereof, a suitable washer 133 being provided. By this arrangement only one bolt is necessary, the construction of the coacting parts on the spindle and the projection preventing rotation about the single bolt used. The head 134 of the bolt is preferably flattened as shown in Figs. 28 and 29 so as to conform to the contour of the spindle. The other end of the spindle is mounted upon a stem 135 of the journal 23, said stem having one or more transverse pins 136 received within notches 137 in the spindle. With this form of spindle, as with the other, the journals 23 and 24 are permanently secured to the chains forming the conveyor, but it is possible to remove the spindle from the journals without destroying the same. This form, however, is readily made and has been found to be most efficient in use.

In both forms of spindle I attach the band permanently thereto. In the modification shown in Figs. 23 to 27 it will be seen that there is a groove 138 provided, and I insert the end of the band therein and then insert a wire 139 as plainly shown in Fig. 24. This wire is of a length to be completely covered by the band when it is rolled on the spindle, and therefore it is impossible to remove the same without sliding the band lengthwise out of the groove 138, and this is impossible. Movement in one direction is blocked by the disk 78 and in the other it may be effectively prevented by tightly crimping together the sides of the groove 138. In the form shown in Figs. 28, 29 and 30, the band 18 is wrapped around the spindle and its ends sewed as indicated in Fig. 30. It may be further secured to the spindle as by suitable tacks.

I mount my platen upon a carriage 140 and this carriage is mounted in the frame to move longitudinally of the bed plate 17 on plates 141 secured to the frame on either side of the bed plate. As plainly shown in Fig. 3 the top of each of the plates 141 is provided with teeth 142 to engage with corresponding teeth on pinions 143 mounted in suitable bearings 144 on the carriage. Referring particularly to Fig. 6 it will be seen that the pinions 143 are mounted upon shafts 145 by which means they are journaled in the bearings 144 and that these shafts are further provided with rollers 146 just inside each pinion, to contact with a track 147 on each side of the frame. These tracks 147 act as supports for the carriage while the pinions 143 insure that the carriage will travel accurately upon the tracks without binding, both ends of the carriage being assured of equal movement.

Journaled in the lower portions of the bearings 144 are a plurality of shafts 148 carrying guide rollers 149 on the ends thereof contacting with the underside of the tracks 147 and thus insuring that the carriage shall not tip.

By this construction I insure against undue pressure of the platen on the paper and gelatin band. In the form of hectograph commonly used hitherto, the roller is pivoted at one of its ends on the carriage and as wear takes place, or as the gelatin band expands, or a thicker band is used, the bearing of the platen is uneven, it being evident that the entire weight will be borne by the edge of the band adjacent the pivot of the platen. Because of the great leverage exerted by the platen when it is brought into operative position, the edge of the band near the pivot of the platen is crushed. This objection has been entirely overcome by my present construction which insures that the travel of the carriage shall be accurate at all times, that the platen shall remain parallel to the bed plate, and that its weight shall be carried entirely by the carriage and not by the gelatin band. By varying the thickness of the shims 140', (Figs. 6 and 8) I can readily adjust the carriage to take up any wear which may occur.

Pivotally mounted upon the carriage 140 is a platen frame 150 pivoted thereto as best shown in Fig. 13, whereby the frame may be raised to the position shown in this figure for the purpose of replacing the platen or cleaning the same or making any other necessary repairs. When the frame is in its operative position as shown, for example, in Figs. 8 and 10, a lug 151 thereon is engaged by a stop 152 on the carriage to limit downward movement of the frame, which is held in position by the latches 153 mounted upon the shaft 154, which, as shown in Fig. 9, is acted upon by a spring 155 to normally turn the same so as to hold the latches 153 in engagement with pins 156 on the frame.

Referring now particularly to Figs. 3 and 7 to 13 inclusive, it will be seen that the platen 157 is rotatably mounted in a yoke comprising a pair of arms 158, pivoted on the platen frame and connected by a transverse member 159, which carries an operating handle 160. By this means the platen is brought into contact with a gelatin band when it is stretched over the bed plate 17. The paper which is to be brought into contact with the gelatin band is received on the guide chute 161 and guided to place by a paper guide 162 slidably mounted on the guide chute and removably held in place by the pivoted spring clamp 163 mounted upon the guide and engaging the rear side of the chute. By this means papers of various size may be accommodated with a minimum of labor.

Pivotally mounted upon the platen frame is an automatic margin bar 164, Figs. 9, 9a, 9b and adjacent one side this bar is provided with an arm 165 having therein a cam slot 166. The upper part of this cam slot is substantially concentric with a pivot of the arms carrying the platen, while the lower portion of this slot is inclined sharply towards the platen, as plainly shown. Received within the cam slot 166 is a pin 167 on the adjacent arm 158. Also pivoted upon the platen frame is a roller 168 resiliently urged as by springs 169 towards the platen. Movement of this roller toward the platen is limited by engagement with a stop 170 upon the platen frame. The operation of the mechanism just described is that when a sheet of paper is placed within the guide chute 161 it is guided by the paper guide into contact with the margin bar 164. Then as the platen is depressed by means of the handle 160, the paper is caught between the platen and the guide roller 168 and brought down on the gelatin band. During the initial movement of the platen the pin 167 does not move the margin bar because, as pointed out above, the upper part of the cam slot 166 is substantially concentric with the pivot on which the platen is mounted. However, at the approximate moment when the platen and the guide roller come in contact, the pin 167 enters the lower end of the cam slot 166, and by pressing against the lower edge thereof actuates the margin bar 164 and withdraws it from under the edge of the paper. The margin bar is completely withdrawn by the time the platen brings the paper into contact with the gelatin band. When the platen is lifted, contact of the pin 167 with the upper edge of the slot 166 will cause a return of the margin bar to position to receive another sheet of paper. It will thus be seen that the margin bar is positively controlled in all its movements by the cam slot and cannot be accidently moved backwardly. In previous machines of this type known to me the margin bar has been controlled by springs and when a stiff card is being used in place of paper, it will sometimes force the margin bar back against the action of the spring resulting in lack of registration. This difficulty is avoided by my construction because of the lack of springs and because of the positive action resulting from my device.

During the above movement of the platen, it is important that it should not rotate about its own axis, because to do so would move the paper, which is being put into position and would thus prevent accurate registration. A tendency for the platen to rotate counterclockwise (Fig. 10) is caused by its engagement with the paper and the guide roller 168. Various means have been devised in the past for preventing this rotation of the platen, but none of them have been altogether satisfactory. I have devised a novel and improved means for achieving this result, which comprises a pawl 171 pivoted on one of the arms 158 and urged into contact with a ratchet 172 on the platen. This pawl will lock the platen against rotation in the direction in which it tends to rotate until said platen comes into close approximation to the gelatin band, at which time the engagement is released by the pawl coming in contact with a stop 173 on the frame. A spring 174 is provided having one end fast to the arm and the other to the pawl, to urge the pawl towards the ratchet 172.

When the frame 150 is lifted to the position shown in Fig. 13, the platen may be readily removed therefrom, it being held in position by means of a pivoted latch 175 (Fig. 11) resiliently urged into engagement with the spindle 157' of the platen by means of a spring 176. This latch holds the spindle 157' in a recess in one of the arms 158, its movement being limited by engagement of a lug 177 with the top of the arm.

When the platen has been brought into engagement with the gelatin band, it is important that it should be retained there and for this purpose I provide one of the arms 158 with a detent 178 to engage a pivoted dog 179 mounted upon the platen frame. As the platen is moved over the gelatin band it will be seen that it is always held in engagement with the paper thereon, and as the carriage carrying the platen is returned to its initial position, the platen stays in contact with the paper on the band and thus insures that the desired impression shall be made. As the carriage approaches its initial position a trip 180 on the frame of the machine engages a pin 181 on a lever 182 connected to the pivot 183 of the dog 179 to rock the dog upwardly and release the platen.

When the machine is used without the automatic margin bar which has just been described, another carriage is provided of the form indicated in Fig. 14. This carriage is substantially like that of the other modification just described, except that the automatic margin bar and the operating means therefor are omitted. With this carriage is employed a standard margin bar 184 which is placed beyond, but closely adjacent to, the end of the bed plate 17. When this margin bar is not intended to be used, I provide means for removing it from its operative position, which is shown in Fig. 14, so that it will not be in the way. Such means is exemplified by the arm 185 carrying the margin bar 184 and pivoted at 186 to the machine frame. This pivot is loose, as indicated in Fig. 14, allowing for a slight vertical movement thereof, and the arm 185 is provided with a detent 187 adapted to engage a notch 188 on the machine frame. The operative position of the margin bar is shown in Fig. 14 and when it is desired to remove the same, the arm 185 may be lifted by a vertical movement of the pivot 186 and then the arm may be rotated counter clockwise of the pivot, and such movement being limited by engagement of the lower end of the arm with the stop 189. In this form the trip 180' is placed rearwardly of the position shown in the other modification so as to permit more extended movement of the carriage, whereby it may cooperate with the margin bar 184 in the position in which it is shown. In this construction, as in the case of the automatic margin bar, the bar is locked against rearward movement which might otherwise be caused by a stiff card or the like, when used in the machine. Such backward movement is prevented with my device by means of the locking engagement between the detent 187 and notch 188.

Fixed on the carriage 140 are stops 190 which I have shown on either side thereof, and these stops cooperate with adjustable stops 191 and 192 (Figs. 1, 6, 7 and 8) the stops 191 being slidably mounted in channels 193 in the machine frame, and the stops 192 being secured in fixed position.

When a band is rolled on its spindle and is not in use, it is fastened in place by a resilient clasp 194 embracing the roll, as plainly shown in Fig. 2, and when a roll is to be used, this clasp is removed and placed in a receptacle mounted upon the frame in a convenient location. Each band is provided at its end with a clip 18' for engagement with the hook 62 on the reel.

In operation the work may be conveniently arranged on the tables 8 and 9 and the operator may stand or sit at the end of the machine shown at the right of Fig. 1. When in this position, it will be obvious that the operator has ready access to the handles 43, 65 and 97 and also that the sponge tray 106 is conveniently at hand. The operation of the machine has been fully set forth in detail and it is only necessary to say here, that a spindle is brought into position by means of the handle 65, the proper position being determined by engagement of the sliding bolt 66 with the recess in the hub 67. The gelatin band on the spindle is then brought over the bed plate 17 and secured to the reel 19. Clockwise rotation of the handle 43 (Fig. 1) will then cause the reel to unwind the band from the spindle, and the band is used in the usual manner. When the roll has been entirely used, a counter clockwise rotation of the handle 43 will cause it to be rewound upon the spindle, where it is then secured by the resilient clasp 194. Then in order to operate the conveyor, it is necessary to release the clutch members 25 and 26 from engagement with each other, and for that purpose it is necessary to give a slight movement of the handle 43 in a clockwise direction. The conveyor may then be operated by the handle 65 to bring another roll into position for use and the operation will be repeated. When a band has been rewound upon its spindle, it is in the exact position that it occupied before being unwound. The ends of the rolls are as true as they were when first wound and therefore when again used will be in the proper position and may be unwound without the trouble and wear upon the band which is always present when a roll is not properly wound.

I am aware that changes in the form, construction and arrangement of parts may be made without departing from the spirit and without sacrificing the advantages of the invention and I reserve the right to make all such changes as fairly fall within the scope of the following claims.

I claim:—

1. A duplicating machine comprising a bed plate, a conveyor, a plurality of rolls of gelatin band carried by said conveyor, and means for bringing any one of said rolls into operative position in relation to said bed plate, whereby the band may be unwound therefrom and stretched over said bed plate.

2. A duplicating machine comprising a conveyor, a plurality of spindles permanently attached to said conveyor, each spindle having a gelatin band permanently attached thereto.

3. A duplicating machine comprising a bed plate, a reel disposed at one end of said bed plate, a conveyor carrying a plurality of rolls of gelatin band, means for operating said conveyor to bring said rolls consecutively into position in relation to said bed plate, so that said band may be unwound from said roll, stretched over said bed plate and fastened to said reel.

4. A duplicating machine comprising a bed plate, a reel disposed at one end of said bed plate, a conveyor carrying a plurality of rolls of gelatin band, means for operating said conveyor to bring said rolls consecutively into position in relation to said bed plate, so that said band may be unwound from said roll, stretched over said bed plate and fastened to said reel, and means for winding said reel to unwind said band from said roll, and for rewinding said band after it has been wound upon said reel.

5. A duplicating mechanism comprising a conveyor having a plurality of spindles thereon, a frame upon which said conveyor is mounted, winding mechanism carried by said frame, and means for bringing said spindles consecutively into position wherein they may be operated by said winding means.

6. A duplicating machine comprising a frame, sprocket wheels journaled in said frame, a chain conveyor on said sprocket wheels and a plurality of rolls of gelatin band carried by said chain conveyor.

7. A duplicating machine comprising a frame, sprocket wheels journaled in said frame, a chain conveyor on said sprocket wheels and a plurality of rolls of gelatin band carried by said chain conveyor, and means for moving certain of said sprocket wheels relative to said frame to adjust said conveyor.

8. A duplicating machine comprising a frame, a bed on the frame, a conveyor on said frame below the bed, a plurality of gelatin band rolls carried by said conveyor, and means on said frame to operate said conveyor.

9. A duplicating machine comprising a frame, a bed on the frame, a conveyor movably mounted on said frame below the bed, a plurality of spindles carried by said conveyor, gelatin band rolls on said spindles, means for moving said conveyor in one direction relative to said frame, and means preventing reverse movement of said conveyor in respect to said frame.

10. A duplicating machine comprising a frame, a bed on the frame, a conveyor on said frame and carrying a plurality of rolls below the bed, means for unwinding the material from one of said rolls, and means for bringing any one of the rolls on said conveyor into position to be operated by said unwinding means.

11. A duplicating machine comprising a frame, a conveyor thereon and carrying a plurality of rolls, means for unwinding one of said rolls, means for bringing any one of the rolls on said conveyor into position to be operated by said unwinding means, and means for rewinding said roll.

12. A duplicating machine comprising a frame, a conveyor on said frame and carrying a plurality of rolls, means for unwinding one of said rolls, and means for bringing any one of said rolls into position to be operated by said unwinding means, said unwinding means comprising a handle, movement of said handle in one direction unwinding said roll and in the other direction winding said roll.

13. A duplicating machine comprising a frame, a bed on the frame, a conveyor on said frame and carrying a plurality of gelatin band rolls below the bed, means for unwinding one of said rolls, means for bringing any one of the rolls on said conveyor into position to be unwound, a reel on said frame, said unwinding means causing rotation of said reel to wind the material from said roll thereon.

14. A duplicating machine comprising a frame, a conveyor on said frame and carrying a plurality of rolls, means for unwinding one of said rolls, means for bringing any one of the rolls on said conveyor into position to be unwound, a reel on said frame, said unwinding means causing rotation of said reel to wind the material from said roll thereon, and means for rewinding said roll, said means causing rotation of said roll, said reel rotating freely during the rewinding operation.

15. A duplicating machine comprising a frame, a conveyor mounted on said frame and carrying a plurality of rolls, a bed plate, means for bringing a roll on said conveyor into position adjacent one end of said bed plate, a reel disposed adjacent the other end of said bed plate, means for winding the material on said roll onto said reel, said roll rotating freely during said winding operation and said reel being positively rotated, and means for rewinding the material from said reel onto said roll, said reel rotating freely during said rewinding operation and said roll being positively rotated.

16. A duplicating machine comprising a frame, a conveyor on said frame and having a plurality of rolls carried by spindles, each spindle having a clutch element on one end thereof, a shaft on said frame, and having a clutch element adapted to co-act with said first named clutch element when said spindle is brought into a predetermined position, and means causing engagement of said elements upon rotation of said shaft in one direction and disengagement thereof upon rotation of said shaft in the opposite direction.

17. A duplicating machine comprising a frame, a conveyor thereon and having a plurality of rolls each carried on a spindle, a clutch element on the end of each spindle, a shaft on said frame and into alignment with which each spindle is adapted to be brought, said shaft having a clutch element adapted to co-act with said first named clutch element, and means causing engagement of said elements upon rotation of said shaft in one direction and disengagement thereof upon rotation of said shaft in the opposite direction, a reel on said frame and provided at one end thereof with a clutch element, a shaft on said frame in alignment with said reel and provided with a clutch element adapted to co-act with said last named element, and means causing engagement of said elements when said shaft is rotated in one direction and disengagement thereof when said shaft is rotated in the opposite direction, and driving connections between said shafts to cause them to rotate in unison, one of said clutches being inoperative when the other is operative.

18. A duplicating machine comprising a frame, a conveyor on said frame and carrying a plurality of rolls, a reel on said frame, means for unwinding the material from any one of said rolls onto said reel, and means for locking both said reel and said roll against rotation.

19. A duplicating machine comprising a frame, a conveyor on said frame and carrying a plurality of rolls upon spindles, means for bringing a roll into position to be unwound, a reel, means to unwind the material from said roll onto said reel, means pivoted adjacent said spindle and adapted to contact therewith, means pivoted adjacent said reel and adapted to contact therewith, and a single means adapted to operate both said pivoted means to bring them into engagement with said spindle and said reel to lock the same against rotation.

20. A duplicating machine comprising a frame, a gelatin band roll thereon, means to unwind said roll, a water pan below the roll, and a wetting roller operating in said pan and contacting directly with the periphery of the gelatin band roll to wet the band on the roll as said roll is unwound.

21. A duplicating machine comprising a frame, a gelatin band roll thereon, means to unwind said roll, means to wet the periphery of said roll as it is unwound, and means to intermittently move said wetting means into contact with said roll.

22. A duplicating machine comprising a frame, a gelatin band roll thereon, means to unwind said roll, and means arranged below the roll to intermittently wet the material of said roll.

23. A duplicating machine comprising a frame, a roll thereon, means to unwind said roll, and means contacting with the periphery of said roll as it is unwound to wet the material thereof, and means to move said wetting means away from said roll.

24. A duplicating machine comprising a frame, a reel therein, a roll supported thereby, means for locking said roll and said reel against rotation, and bracing means engaging spaced points on said frame to press the same when said locking means is applied.

25. A duplicating machine comprising a frame having a shelf thereon, a spindle conveyor resting on said shelf, a dog pivoted on one side of said shelf, and adapted to engage a pin on the other side thereof, for the purpose set forth.

26. A duplicating machine comprising a frame, a conveyor on said frame, and carrying a plurality of rolls, and a counting mechanism carried by said frame, and having means adapted to be actuated by the hub of one of said rolls.

27. A duplicating machine comprising a conveyor, a plurality of spindles permanently secured thereto, and a gelatin band rolled on each of said spindles and permanently secured thereto at one end.

28. A hectograph duplicating machine comprising a movable carriage, a frame pivotally mounted on said carriage, a yoke pivotally mounted in said frame, and a rotatable platen carried by said yoke.

29. A duplicating machine comprising a movable carriage, a frame pivotally mounted on said carriage, a yoke pivotally mounted on said frame, a rotatable platen carried by said yoke, and means for latching said frame in operative position on said carriage.

30. A duplicating machine comprising a main frame, a bed plate on said frame, tracks at the sides of the frame below the bed plate, a rack alongside each track, a carriage to travel on the frame, a platen carried by said carriage above the bed plate, and a pair of shafts mounted in different horizontal planes in the frame below the bed plate, the one carrying a roller and pinion at each end and the other carrying a roller at each end, the said pinions meshing with said racks and the rollers engaging opposite faces of the tracks.

31. A duplicating machine comprising a main frame, a platen carriage movable in the frame, a track on the frame at each side of the carriage, a plate alongside of each track and having a toothed upper edge, two shafts mounted in the carriage one above the other, the lower shaft carrying rollers at its ends to engage the lower edge of said tracks, the upper shaft carrying rollers at its ends to engage the upper edge of the tracks, and pinions to engage the toothed plates.

32. A hectograph duplicating machine comprising a main frame, a bed plate on the frame, a gelatin band on the bed plate, a carriage movable on the main frame under the bed plate, a frame pivotally mounted on said carriage, a yoke pivotally mounted on said frame, a platen carried by said yoke, a ratchet on said platen, a pawl pivoted on the yoke, and means for controlling the operation of said pawl to prevent reverse movement of said platen until the platen is moved into operative relation to the band.

33. A hectograph duplicating machine comprising a platen frame, a platen pivotally mounted thereon, said platen having a ratchet at one end thereof, a pawl resiliently urged into engagement with said ratchet, and a stop on said frame adapted to release said pawl from engagement with said ratchet when said platen is brought to its lowest position.

34. A hectograph duplicating machine comprising a main frame, a bed plate on the frame, a gelatin band on the bed plate, a carriage movable over said bed plate and band, a platen on the carriage and movable into and out of operative relation to the bed plate, a margin bar pivoted on the carriage and adapted to receive the edge of a sheet of paper when the platen is out of operative relation to the bed plate, and a cam connection between the platen and the margin bar to disengage the margin bar from the paper when the platen engages the paper to press it upon the band.

35. A hectograph duplicating machine comprising a bed plate, a carriage movable in respect to said bed plate, an arm pivotally supported on said carriage and supporting a platen, said arm having a pin thereon, a margin bar pivotally supported on said carriage and provided with a cam slot to receive said pin, and means for operating said arm to bring said platen into and out of operative relation with said bed plate, said movement of the platen operating said margin bar.

36. A hectograph duplicating machine comprising a bed plate, a carriage movable in respect to said bed plate, an arm pivotally supported by said carriage and carrying a platen, a cam pin on said arm, a margin bar pivotally supported by said carriage, an arm on said bar and having a cam slot receiving said pin, the upper part of said slot being substantially concentric with the pivot of the platen arm and the lower part thereof being shaped to cause said margin bar to move away from said platen, for the purpose set forth.

37. A hectograph duplicating machine comprising a main frame, a bed plate on the main frame, a gelatin band on the bed plate, a carriage movable over the bed plate and the band, a frame pivoted on the carriage, a yoke pivoted on said frame, a platen carried by said yoke, an arm on said frame and provided with a cam slot, a pin on the yoke engaging the slot and a margin bar carried by said frame and adapted to be operated by said pin and slot connection.

38. A hectograph duplicating machine comprising a frame, a margin bar on said frame, means securing said margin bar in operative position, and means providing said margin bar with two movements independent of each other, one of said movements releasing said securing means and the other removing said bar from operative position.

39. A hectograph duplicating machine comprising a frame, a bed plate carried by said frame, a margin bar pivoted to said frame, means securing said margin bar in operative relation to said bed plate, and means permitting bodily movement of the margin bar to release said securing means.

40. A hectograph duplicating machine comprising a frame, a bed plate carried by said frame, a margin bar supported by said frame and movable toward and from said bed plate, means securing said margin bar in operative relation to said bed plate, means permitting bodily movement of the margin bar for releasing said securing means, and means limiting movement of said bar away from said operative position.

41. A hectograph duplicating machine comprising a frame, a margin bar loosely pivoted thereon, a bed plate carried by said frame, and means holding said margin bar in operative relation to said bed plate, said margin bar being capable of sufficient bodily movement for releasing said holding means.

42. A hectograph duplicating machine comprising a platen carriage, a guide chute on the carriage, a paper guide mounted on the chute to slide transversely thereof, and a pivoted spring clamp connected to the upper end of the paper guide and arranged to engage the back of the chute to clamp the guide in a desired position on the chute.

43. A duplicating machine comprising a carriage, a frame pivoted on the carriage, a yoke pivoted on the frame and having outwardly extending arms, a platen pivotally mounted on said arms, one of said arms having a recess, a latch pivoted on said recessed arm, the spindle of the platen being received in said recess and engaged by said latch to hold the spindle in the recess, and a spring having one end secured on said arm and the other end secured to said latch to hold the latch in engagement with the spindle.

44. In a duplicating machine the combination of a main frame, a bed on the frame, a conveyor arranged to travel in an orbit below the bed, said orbit of travel comprising a horizontal path adjacent the bed, and a plurality of rolls, each carrying a gelatin band carried by said conveyor.

45. In a duplicating machine the combination of a main frame, a bed on the frame, a conveyor arranged to travel in a rectangular orbit in the frame below the bed, a part of said orbit of travel comprising a horizontal path adjacent the bed, a plurality of spindles, each carrying a gelatin band, and means for operating the conveyor.

46. In a duplicating machine a conveyor, a plurality of rolls of gelatin band thereon, means for operating said conveyor to bring said rolls consecutively into position for use, and means for preventing unwinding of the rolls not in use.

47. In a duplicating machine, a conveyor, a plurality of rolls of gelatin band thereon, means for operating said conveyor to bring said rolls consecutively into position for use, and a resilient clasp adapted to embrace the rolls which are not in use to prevent unwinding thereof.

48. In a duplicating machine, a conveyor, a plurality of spindles permanently secured thereon, a roll of gelatin band permanently secured on each spindle and provided with a clip for attachment to a reel whereby the band may be unwound, means for operating said conveyor to bring said rolls consecutively into position to be unwound, and means to prevent unwinding of the rolls not in use.

49. A duplicating machine comprising a plurality of rolls of duplicating bands, means for bringing said rolls successively into operative position, and means for permanently securing said rolls together.

50. A duplicating machine comprising a plurality of rolls of duplicating bands, means for permanently connecting said rolls together, means for successively moving said rolls into operative position, and means preventing a reversal of said movement.

51. A duplicating machine comprising an endless conveyor, a plurality of rolls of duplicating bands permanently secured to said conveyor and carried thereby, and means for unwinding each of said rolls.

52. A duplicating machine comprising an endless conveyor, a plurality of rolls of duplicating bands permanently secured to said conveyor and carried thereby, means for unwinding each of said rolls, and means for rewinding each of said rolls after it has been unwound.

53. A duplicating machine comprising a plurality of duplicating bands mounted on said machine, means permanently connecting said duplicating bands together, and means for successively moving said bands into operative position.

54. A duplicating machine comprising a plurality of duplicating bands mounted thereon and permanently connected together, means for successively moving said bands into operative position, and means for preventing reversal of said movement.

55. A duplicating machine comprising a plurality of rolls of gelatin bands mounted thereon, conveying means for moving said rolls successively into operative position, and means to unwind each of said rolls when in said operative position.

56. A duplicating machine comprising a plurality of rolls of gelatin bands mounted thereon, conveying means for moving said rolls successively into operative position, means to unwind each of said rolls when in said operative position, and means to rewind said roll after it has been unwound.

57. A duplicating machine comprising a frame, a conveyor mounted on said frame and having a plurality of spindles thereon, a gelatin band permanently secured to each spindle, a reel for receiving the band from any one of said spindles, and means for feeding said band from any one of said spindles to said reel.

58. A duplicating machine comprising a frame, a conveyor mounted on said frame and having a plurality of spindles thereon, a gelatin band permanently secured to each spindle, a reel for receiving the band from any one of said spindles, means for feeding said band from any one of said spindles to said reel, and means for feeding said band from said reel to said spindle to rewind it thereon.

59. A duplicating machine comprising a frame, a conveyor mounted on said frame and having a plurality of spindles thereon, a gelatin band permanently secured to each spindle, a reel for receiving the band from any one of said spindles, means for feeding said band from any one of said spindles to said reel, and means for holding said spindle and said reel immovable during said feeding operations.

60. A duplicating machine comprising a frame, a conveyor mounted on said frame and having a plurality of spindles thereon, a gelatin band permanently secured to each spindle, a reel for receiving the band from any one of said spindles, means for feeding said band from any one of said spindles to said reel, means for feeding said band from said reel to said spindle to rewind it thereon, and means for holding said spindle and said reel immovable during said feeding operations.

61. In a duplicating machine the combination of a main frame, a bed on the frame, a conveyor arranged to travel in an orbit below the bed, a plurality of rolls on the conveyor each comprising a gelatin band, and means for unwinding any one of said gelatin rolls across said bed and rewinding it at the opposite end of said bed.

62. In a duplicating machine the combination of a main frame, a bed on the frame, a conveyor arranged to travel in an orbit below the bed, a plurality of rolls on the conveyor each comprising a gelatin band, said orbit of travel comprising a horizontal path beneath the bed, means for stretching the band from any one roll across the bed and maintaining it in stretched condition while unwinding it from the roll, and means for rewinding the roll.

63. A hectograph duplicating machine comprising a carriage, a platen pivotally mounted on said carriage, a margin bar pivotally mounted on said carriage, and a cam slot and pin connection between said platen and said margin bar causing movement of said margin bar when said platen is raised.

64. A hectograph duplicating machine comprising a carriage, a platen pivotally mounted on said carriage, a margin bar pivotally mounted on said carriage, and a cam slot and pin connection between said platen and said margin bar causing movement of said margin bar when said platen is either raised or lowered.

65. A hectograph duplicating machine comprising a platen adapted to operate on a sheet of paper, a margin bar to receive the edge of said sheet of paper, and means to move said margin bar into and out of position to so engage a sheet of paper, and a cam slot and pin connection between said platen and said margin bar controlling said movement through movement of said platen.

66. A hectograph duplicating machine comprising a platen carriage, a platen pivotally mounted on said carriage, a margin bar pivotally mounted on said carriage, and a pin and cam slot connection between said platen and said margin bar to cause movement of said margin bar to be controlled by movement of said platen.

67. A hectograph duplicating machine comprising platen carriage, a platen pivotally mounted thereon and provided with a pin, and a margin bar pivotally mounted on said carriage and having a cam slot to receive said pin, for the purpose set forth.

68. In a machine of the class described, a bed adapted to hold and support a gelatin pad sheet, an impression carriage mounted to be moved forward and backward over the said bed in the function of impressing paper thereto, spindles adapted to carry the said gelatin pad sheet arranged at each end of the said bed and means provided for winding the sheet from one spindle upon the other as different sections of the gelatin pad sheet are used, a moistening device composed of a roll revolving within a water box and means for adjusting the said roller automatically up in contact with the gelatin pad sheet as the same is carried on one of the spindles.

69. In a device of the class described, a moistening device supported beneath the spindle upon which the gelatin pad sheet is wound and adapted to automatically press up against the gelatin pad sheet as the same is carried by the spindle and means for holding the said moistening device away from the said spindle and gelatin pad sheet.

70. In a machine of the class described, a moistening device supported underneath the spindle upon which a gelatin pad sheet is wound and adapted to automatically distribute moisture on the sheet as it is unwound from the spindle.

71. In a machine of the class described, a bed adapted to support a gelatin pad sheet, spindle mountings at each end of the bed adapted to support and carry a gelatin pad sheet wound thereon, a moistening device mounted beneath one of the spindles and adapted to distribute moisture upon the gelatin pad sheet as it is unwound from a spindle at one end of the said bed.

72. In a machine of the class described, a bed adapted to support and carry a gelatin pad sheet, spindles for supporting the said gelatin pad sheet as the same is wound thereon, a moistening device adapted to move to and from the gelatin pad sheet wound upon one of the said spindles.

73. In a machine of the class described, a bed adapted to support and carry a gelatin pad sheet, spindles adapted to support the said gelatin pad sheet as the same is wound thereon, a moistening device composed of a roller mounted to revolve in a water container and supported beneath one of the spindles upon which the said gelatin pad sheet is wound and means for automatically keeping the said roller in contact with the gelatin pad sheet as the same is wound on one of the said spindles.

74. In a device of the class described, a film moistening device having a liquid reservoir, a freely revoluble cylinder partially immersed in said reservoir and yieldingly pressed against a roll of film and means operable from a distance for moving said moistening device to an inoperative position.

75. In a machine of the class described, the combination with an impression bed, of a trackway on each side of said bed, an impression carriage provided with a frame section mounted on said trackways and a main section pivotally mounted on said frame section and adapted to be swung upwardly clear of said bed.

JOHN J. FLANIGAN.